US011352459B2

(12) United States Patent
Custodero et al.

(10) Patent No.: US 11,352,459 B2
(45) Date of Patent: Jun. 7, 2022

(54) TIRE PROVIDED WITH AN OUTER SIDEWALL COMPRISING A THERMOPLASTIC ELASTOMER COMPRISING AT LEAST ONE SATURATED ELASTOMER BLOCK

(71) Applicant: COMPAGNIE GENERALE DES ETABLISSEMENTS MICHELIN, Clermont-Ferrand (FR)

(72) Inventors: Emmanuel Custodero, Clermont-Ferrand (FR); Baptiste Foglieni, Clermont-Ferrand (FR); Christophe Chouvel, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 119 days.

(21) Appl. No.: 16/465,692

(22) PCT Filed: Nov. 30, 2017

(86) PCT No.: PCT/EP2017/081015
§ 371 (c)(1),
(2) Date: May 31, 2019

(87) PCT Pub. No.: WO2018/100080
PCT Pub. Date: Jun. 7, 2018

(65) Prior Publication Data
US 2019/0300640 A1 Oct. 3, 2019

(30) Foreign Application Priority Data

Dec. 2, 2016 (FR) ...................... 1661878

(51) Int. Cl.
*C08F 297/08* (2006.01)
*B60C 1/00* (2006.01)
*C08K 3/04* (2006.01)
*C08K 3/36* (2006.01)

(52) U.S. Cl.
CPC ............ *C08F 297/086* (2013.01); *B60C 1/00* (2013.01); *B60C 1/0025* (2013.01); *C08K 3/04* (2013.01); *C08K 3/36* (2013.01); *C08K 2201/014* (2013.01)

(58) Field of Classification Search
CPC ................. C08F 297/086; B60C 1/00
See application file for complete search history.

(56) References Cited

U.S. PATENT DOCUMENTS

| 3,464,477 | A | 9/1969 | Verdier |
| 4,824,900 | A | 4/1989 | Sakurai |
| 4,946,899 | A | 8/1990 | Kennedy et al. |
| 5,977,238 | A | 11/1999 | Labauze |
| 6,013,718 | A | 1/2000 | Cabioch et al. |
| 6,075,084 | A | 6/2000 | Mabry et al. |
| 6,503,973 | B2 | 1/2003 | Robert et al. |
| 6,598,632 | B1 | 7/2003 | Moreland et al. |
| 6,598,637 | B2 | 7/2003 | Lechtenbohmer et al. |
| 6,666,248 | B2 | 12/2003 | Omoto et al. |
| 6,774,255 | B1 | 8/2004 | Tardivat et al. |
| 6,815,473 | B2 | 11/2004 | Robert et al. |
| 6,849,754 | B2 | 2/2005 | Deschler et al. |
| 7,217,751 | B2 | 5/2007 | Durel et al. |
| 7,250,463 | B2 | 7/2007 | Durel et al. |
| 7,312,264 | B2 | 12/2007 | Gandon-Pain |
| 7,335,692 | B2 | 2/2008 | Vasseur et al. |
| 7,488,768 | B2 | 2/2009 | Tardivat et al. |
| 7,510,670 | B2 | 3/2009 | Chaves et al. |
| 7,649,043 | B2 | 1/2010 | Bergman |
| 7,820,771 | B2 | 10/2010 | Lapra et al. |
| 8,461,269 | B2 | 6/2013 | Varagniat et al. |
| 8,492,475 | B2 | 7/2013 | Araujo Da Silva et al. |
| 8,883,929 | B2 | 11/2014 | Gandon-Pain et al. |
| 8,957,155 | B2 | 2/2015 | Seeboth et al. |
| 9,010,393 | B2 | 4/2015 | Araujo Da Silva et al. |
| 9,403,406 | B2 | 8/2016 | Custodero et al. |
| 9,849,727 | B2 | 12/2017 | Abad et al. |
| 10,471,775 | B2 | 11/2019 | Fugier et al. |
| 10,550,247 | B2 | 2/2020 | Tokimune et al. |
| 2001/0036991 | A1 | 11/2001 | Robert et al. |
| 2002/0016404 | A1 | 2/2002 | Mabry et al. |
| 2002/0037962 | A1 | 3/2002 | Lechtenbohmer et al. |
| 2002/0183436 | A1 | 12/2002 | Robert et al. |
| 2003/0005993 | A1 | 1/2003 | Omoto et al. |
| 2004/0051210 | A1 | 3/2004 | Tardivat et al. |

(Continued)

FOREIGN PATENT DOCUMENTS

| CN | 103517812 A | 1/2014 |
| EP | 1097966 A1 | 5/2001 |

(Continued)

OTHER PUBLICATIONS

International Search Report dated Feb. 15, 2018, in corresponding PCT/EP2017/081015 (4 pages).
J.E. Puskas, et al., "Polyisobutylene-Containing Block Polymers by Sequential Monomer Addition", J. Polymer Sci.: Part A, vol. 30, pp. 41-48 (1992).
Zs. Fodor, et al., "Polyisobutylene-containing block polymers by sequential monomer addition", Polymer Bull, vol. 29, pp. 697-704 (1992).
G. Kaszas, et al., "New Thermoplastic Elastomers of Rubbery Polyisbutylene and Glassy Cyclopolyisoprene Segments", J. Appl. Polymer Sci., vol. 39, pp. 119-144 (1990).

(Continued)

Primary Examiner — Arrie L Reuther
(74) Attorney, Agent, or Firm — Venable LLP

(57) ABSTRACT

A tire has an outer sidewall, said outer sidewall comprising at least one composition comprising an elastomeric matrix which predominantly comprises by weight one or more thermoplastic elastomers comprising at least one elastomer block and at least one thermoplastic block, the elastomer block(s) being saturated.

14 Claims, No Drawings

(56) References Cited

U.S. PATENT DOCUMENTS

| | | |
|---|---|---|
| 2004/0127617 A1 | 7/2004 | Vasseur et al. |
| 2004/0132880 A1 | 7/2004 | Durel et al. |
| 2005/0004297 A1 | 1/2005 | Durel et al. |
| 2006/0089445 A1 | 4/2006 | Gandon-Pain |
| 2007/0161735 A1 | 7/2007 | Bergman |
| 2007/0228322 A1 | 10/2007 | Chaves et al. |
| 2008/0132644 A1 | 6/2008 | Lapra et al. |
| 2009/0186961 A1 | 7/2009 | Araujo Da Silva et al. |
| 2009/0209709 A1 | 8/2009 | Araujo Da Silva et al. |
| 2009/0234066 A1 | 9/2009 | Araujo Da Silva et al. |
| 2009/0270558 A1 | 10/2009 | Gandon-Pain et al. |
| 2010/0022714 A1 | 1/2010 | Varagniat et al. |
| 2010/0145089 A1 | 6/2010 | Mignani et al. |
| 2011/0021702 A1 | 1/2011 | Gandon-Pain et al. |
| 2011/0152458 A1 | 6/2011 | Araujo Da Silva et al. |
| 2011/0294953 A1 | 12/2011 | Seeboth et al. |
| 2012/0208948 A1 | 8/2012 | Gandon-Pain et al. |
| 2013/0116376 A1 | 5/2013 | Custodero et al. |
| 2013/0299053 A1 | 11/2013 | Fugier et al. |
| 2014/0076473 A1* | 3/2014 | Abad .................. B60C 11/0008 152/209.1 |
| 2014/0083589 A1 | 3/2014 | Abad et al. |
| 2014/0299249 A1 | 10/2014 | Custodero et al. |
| 2015/0034226 A1 | 2/2015 | Abad et al. |
| 2015/0034230 A1 | 2/2015 | Abad et al. |
| 2016/0130426 A1 | 5/2016 | Miyazaki et al. |
| 2016/0339743 A1 | 11/2016 | Abad et al. |
| 2016/0347121 A1 | 12/2016 | Greiveldinger et al. |
| 2017/0151842 A1 | 6/2017 | Custodero et al. |
| 2017/0151843 A1 | 6/2017 | Custodero et al. |
| 2017/0313130 A1 | 11/2017 | Chouvel et al. |
| 2018/0043734 A1 | 2/2018 | Greiveldinger et al. |
| 2018/0178584 A1 | 6/2018 | Chouvel |
| 2018/0258260 A1 | 9/2018 | Tokimune et al. |
| 2019/0144646 A1 | 5/2019 | Miura |
| 2019/0300684 A1 | 10/2019 | Chouvel |
| 2020/0392311 A1 | 12/2020 | Chouvel et al. |
| 2021/0214530 A1 | 7/2021 | Chouvel et al. |

FOREIGN PATENT DOCUMENTS

| | | |
|---|---|---|
| EP | 1127909 A1 | 8/2001 |
| EP | 1231080 A1 | 8/2002 |
| EP | 1270273 A1 | 1/2003 |
| EP | 1357149 A2 | 10/2003 |
| EP | 1462479 A1 | 9/2004 |
| EP | 1033265 A2 | 9/2009 |
| EP | 2716700 A1 | 4/2014 |
| EP | 3216827 A1 | 9/2017 |
| FR | 1502689 | 11/1967 |
| FR | 2740778 A1 | 5/1997 |
| FR | 2765882 A1 | 1/1999 |
| WO | 97/36724 A2 | 10/1997 |
| WO | 99/09036 A1 | 2/1999 |
| WO | 99/16600 A1 | 4/1999 |
| WO | 01/92402 A1 | 12/2001 |
| WO | 02/30939 A1 | 4/2002 |
| WO | 02/31041 A1 | 4/2002 |
| WO | 02/083782 A1 | 10/2002 |
| WO | 02/088238 A1 | 11/2002 |
| WO | 03/016387 A1 | 2/2003 |
| WO | 2004/096865 A2 | 11/2004 |
| WO | 2006/023815 A1 | 3/2006 |
| WO | 2006/047509 A2 | 5/2006 |
| WO | 2006/069792 A1 | 7/2006 |
| WO | 2006/069793 A1 | 7/2006 |
| WO | 2006/125532 A1 | 11/2006 |
| WO | 2006/125533 A1 | 11/2006 |
| WO | 2006125534 A1 | 11/2006 |
| WO | 2007061550 A1 | 5/2007 |
| WO | 2007/098080 A2 | 8/2007 |
| WO | 2008/003434 A1 | 1/2008 |
| WO | 2008/003435 A1 | 1/2008 |
| WO | 2008/055986 A2 | 5/2008 |
| WO | 2010/072685 A1 | 7/2010 |
| WO | 2012/076456 A1 | 6/2012 |
| WO | 2013/087485 A1 | 6/2013 |
| WO | 2017/093687 A1 | 6/2017 |

OTHER PUBLICATIONS

J.E. Puskas, et al., "New Transparent Flexible UV-Cured Films from Polyisobutylene-Polyisoprene Block Polymers", J. Macromol. Sci., vol. A28(1), pp. 65-80 (1991).

R. Mildenburg, et al., "Hydrocarbon Resins", VCH, New York, chapter 5.5, pp. 141-146 (1997).

J.P. Kennedy, et al., "Polyisobutylene-Containing Block Copolymers by Sequential Monomer Addition", Macromolecules, vol. 24, pp. 6572-6577 (1991).

E. Camano et al., "Evaluation of the Thermal Diffusivity of Rubber Compounds Through the Glass Transition Range", Journal of Applied Polymer Science, vol. 63, No. 2, pp. 157-162 (1997).

S. Brunauer, et al., "Adsorption of Gases in Multimolecular Layers", J. Am. Chem. Soc., vol. 60, pp. 309-319 (1938).

* cited by examiner

TIRE PROVIDED WITH AN OUTER SIDEWALL COMPRISING A THERMOPLASTIC ELASTOMER COMPRISING AT LEAST ONE SATURATED ELASTOMER BLOCK

BACKGROUND

The present invention relates to tyres and more particularly to tyre outer sidewalls, that is to say, by definition, to the elastomeric layers located radially on the outside of the tyre, which are in contact with the ambient air.

It is possible to define, within the tyre, three types of regions:

- The radially exterior region in contact with the ambient air, this region essentially consisting of the tread and of the outer sidewall of the tyre. An outer sidewall is an elastomeric layer positioned outside the carcass reinforcement with respect to the internal cavity of the tyre, between the crown and the bead, so as to completely or partially cover the region of the carcass reinforcement extending from the crown to the bead.
- The radially interior region in contact with the inflation gas, this region generally consisting of the layer airtight to the inflation gas, sometimes referred to as inner liner.
- The internal region of the tyre, that is to say that between the exterior and interior regions. This region includes layers or plies which are referred to here as internal layers of the tyre. These are, for example, carcass plies, tread underlayers, tyre belt plies or any other layer which is not in contact with the ambient air or the inflation gas of the tyre.

The outer sidewall generally consists of a rubber composition comprising predominantly diene elastomers, for example a blend of natural rubber and polybutadiene. In a known manner, this composition also comprises at least one anti-ozonant intended to reduce the formation and propagation of cracks under prolonged static and dynamic stresses in the presence of ozone, and also waxes, intended to form a protective coating at the surface of the sidewalls so as to provide additional protection under static stresses.

The combination of these anti-ozonants and these waxes has proved effective in minimizing cracks at the sidewall surface. Unfortunately, the most effective anti-ozonants are also characterized by a very strong ability to migrate through the elastomer substrate and to mark and turn yellow or brown the outer faces of the sidewalls. This phenomenon is known as "staining".

It has been sought to minimize this phenomenon by using, in these outer sidewall compositions, other elastomer matrices provided for conferring, on these compositions, an increased resistance to ozone and, consequently, capable of reducing the amount of anti-ozonants required and thus the abovementioned unwanted effects due to the migration thereof.

There is thus a need to develop a tyre outer sidewall which is more resistant to ozone.

SUMMARY

Thus, a subject of the invention is a tyre having an outer sidewall, said outer sidewall comprising at least one composition comprising an elastomeric matrix which comprises predominantly by weight one or more thermoplastic elastomers comprising at least one elastomer block and at least one thermoplastic block, the elastomer block(s) being saturated.

The tyre according to the invention comprising the outer sidewall makes it possible to minimize the appearance of cracks on said sidewall during exposure to an ozone-containing atmosphere.

DETAILED DESCRIPTION

The invention and its advantages will be easily understood in the light of the description and the exemplary embodiments that follow.

In the present description, unless expressly indicated otherwise, all the percentages (%) indicated are percentages by weight.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

In the present application, the term "parts per hundred parts of elastomer" or "phr" is intended to mean the part by weight of a constituent per 100 parts by weight of the elastomer(s), i.e. of the total weight of the elastomer(s), whether they are thermoplastic or non-thermoplastic, in the elastomeric matrix. Thus, a constituent at 60 phr will mean, for example, 60 g of this constituent per 100 g of elastomer.

In the present application, the term "elastomeric matrix" denotes all of the elastomers of the composition.

The expression "predominantly by weight one or more thermoplastic elastomers comprising at least one elastomer block and at least one thermoplastic block, the elastomer block(s) being saturated" is intended to mean that the elastomeric matrix comprises at least 50% by weight, preferably at least 65% by weight, more preferentially at least 70% by weight, in particular at least 75% by weight, even more preferentially a content of greater than 75% by weight of said thermoplastic elastomers relative to all of the elastomers present in the elastomeric matrix of the composition.

The term "thermoplastic elastomer (TPE)" is intended to mean, in a known manner, a polymer with a structure that is intermediate between a thermoplastic polymer and an elastomer.

A thermoplastic elastomer consists of one or more rigid "thermoplastic" segments connected to one or more flexible "elastomer" segments.

Thus, the thermoplastic elastomer(s) of the outer sidewall composition that can be used according to the invention comprise at least one elastomer block and at least one thermoplastic block.

Typically, each of these segments or blocks contains a minimum of more than 5, generally of more than 10, base units.

Thus, a composition in which a resin or a thermoplastic polymer and an elastomer are mixed does not constitute a thermoplastic elastomer for the purposes of the present invention.

In the present application, when reference is made to the glass transition temperature of a thermoplastic elastomer, it is the glass transition temperature relating to the elastomer block (unless otherwise indicated). Indeed, in a known manner, thermoplastic elastomers have two glass transition temperature peaks (Tg, measured according to ASTM D3418), the lowest temperature being related to the elastomer part of the thermoplastic elastomer and the highest temperature being related to the thermoplastic part of the thermoplastic elastomer. Thus, the flexible blocks of the thermoplastic elastomers are generally defined by a Tg below or equal to ambient temperature (25° C.), whilst the rigid blocks have a Tg above or equal to 80° C. In order to be of both elastomeric and thermoplastic nature, the thermoplastic elastomer must be provided with blocks that are sufficiently incompatible (that is to say different due to their respective weight, their respective polarity or their respective Tg) in order to retain their characteristic elastomer block or thermoplastic block properties.

Thus, the thermoplastic elastomer(s) that can be used according to the invention (thus the elastomer block(s) of the thermoplastic elastomers) preferentially have a glass transition temperature which is less than or equal to 25° C., more preferentially less than or equal to 10° C., and even more preferentially less than or equal to −10° C.

The number-average molecular weight (denoted by Mn) of the thermoplastic elastomers is preferentially between 30 000 and 500 000 g/mol, more preferentially between 40 000 and 400 000 g/mol, even more preferentially between 50 000 g/mol and 300 000 g/mol. Below the minima indicated, there is a risk of the cohesion between the elastomer chains of the thermoplastic elastomers being affected, in particular due to their possible dilution (in the presence of an extender oil); furthermore, there is a risk of an increase in the working temperature affecting the mechanical properties, in particular the properties at break, with the consequence of a reduced "hot" performance. Furthermore, an excessively high Mn weight can be detrimental to the implementation.

The number-average molecular weight (Mn) of the thermoplastic elastomers is determined in a known manner, by size exclusion chromatography (SEC). The sample is first dissolved in a suitable solvent at a concentration of about 2 g/l and then the solution is filtered on a filter with a porosity of 0.45 m before injection. The apparatus used is a Waters Alliance chromatographic line. The injected volume of the solution of the polymer sample is 100 μl. The detector is a Waters 2410 differential refractometer and its associated software, for making use of the chromatographic data, is the Empower system. The conditions can be adjusted by those skilled in the art. For example, in the case of TPEs of COPE type, the elution solvent is hexafluoroisopropanol with sodium trifluoroacetate salt at a concentration of 0.02M, the flow rate is 0.5 ml/min, the temperature of the system is 35° C. and the analysis time is 90 min. Use is made of a set of three PHENOMENEX columns in series, with "PHENO-GEL" trade names (pore size: $10^5$, $10^4$, $10^3$ A). For example, in the case of styrene thermoplastic elastomers, the sample is first dissolved in tetrahydrofuran at a concentration of approximately 1 g/l and then the solution is filtered on a filter with a porosity of 0.45 m before injection. The apparatus used is a Waters Alliance chromatographic line. The elution solvent is tetrahydrofuran, the flow rate is 0.7 ml/min, the temperature of the system is 35° C. and the analysis time is 90 min. A set of four Waters Styragel columns (an HMW7 column, an HMW6E column and two HT6E columns) are used in series. The injected volume of the solution of the polymer sample is 100 μl. The detector is a Waters 2410 differential refractometer and its associated software, for making use of the chromatographic data, is the Waters Millennium system. The calculated average molar masses are relative to a calibration curve produced with polystyrene standards.

The polydispersity index (PI=Mw/Mn, with Mw the weight-average molecular weight) of the thermoplastic elastomer(s) is preferably less than 3, more preferentially less than 2 and more preferentially still less than 1.5.

The thermoplastic elastomers that can be used according to the invention may be copolymers with a small number of blocks (less than 5, typically 2 or 3), in which case these blocks preferably have high weights of greater than 15 000 g/mol.

The thermoplastic elastomers may also be copolymers with a large number of smaller blocks (more than 30, typically from 50 to 500), in which case these blocks preferably have relatively low weights, for example from 500 to 5000 g/mol; these thermoplastic elastomers will subsequently be referred to as multiblock thermoplastic elastomers.

According to a first variant, the thermoplastic elastomers that can be used according to the invention are in a linear form.

In a first particular embodiment of this first variant, the thermoplastic elastomers are diblock copolymers: thermoplastic block/elastomer block.

In a second particular embodiment of this first variant, the thermoplastic elastomers are triblock copolymers: thermoplastic block/elastomer block/thermoplastic block, that is to say a central elastomer block and a terminal thermoplastic block at each of the two ends of the elastomer block.

In a third particular embodiment of this first variant, the thermoplastic elastomers are formed of a linear series of elastomer blocks and thermoplastic blocks (multiblock thermoplastic elastomers).

According to a second variant, the thermoplastic elastomers that can be used according to the invention are in a star-branched form comprising at least three branches.

For example, the thermoplastic elastomers can then be composed of a star-branched elastomer block comprising at least three branches and of a thermoplastic block located at the end of each of the branches of the elastomer block. The number of branches of the central elastomer can vary, for example, from 3 to 12 and preferably from 3 to 6.

According to a third variant, the thermoplastic elastomers that can be used according to the invention are in a branched or dendrimer form. The thermoplastic elastomers can then be composed of a branched or dendrimer elastomer block and of a thermoplastic block located at the end of the branches of the dendrimer elastomer block.

As previously explained, the thermoplastic elastomer(s) that can be used according to the invention comprise at least one elastomer block and at least one thermoplastic block, the elastomer block(s) being saturated.

The term "saturated elastomer block" is intended to mean that this block comprises a content of moieties or units derived from conjugated diene monomers which is less than 15 mol %.

The saturated elastomer blocks are generally formed by the polymerization of ethylene monomers. Mention may in particular be made of polyalkylene blocks such as random ethylene/propylene or ethylene/butylene copolymers. These saturated elastomer blocks can also be obtained by hydrogenation of unsaturated elastomer blocks. The term "unsaturated elastomer block" is intended to mean that this block predominantly comprises moieties comprising ethylenic unsaturations.

They can also be aliphatic blocks resulting from the family of the polyethers, polyesters or polycarbonates. In particular, the saturated elastomer blocks may especially be formed by polyethers, especially polytetramethylene glycol (PTMG), polyethylene glycols (PEGs).

According to one variant, the monomers polymerized in order to form a saturated elastomer block may be copolymerized, randomly, with at least one other monomer so as to form a saturated elastomer block. According to this variant, the molar fraction of polymerized monomer, other than an ethylene monomer, relative to the total number of moieties of the saturated elastomer block, has to be such that this block retains its saturated elastomer properties. Advantageously, the molar fraction of this other comonomer can range from 0 to 50%, more preferentially from 0 to 45% and more preferentially still from 0 to 40%.

For example, conjugated $C_4$-$C_{14}$ dienes may be copolymerized with the ethylenic monomers, the ethylenic moieties remaining predominant as seen above.

Preferably, these conjugated dienes are selected from isoprene, butadiene, 1-methylbutadiene, 2-methylbutadiene, 2,3-dimethyl-1,3-butadiene, 2,4-dimethyl-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 1,3-hexadiene, 2-methyl-1,3-hexadiene, 3-methyl-1,3-hexadiene, 4-methyl-1,3-hexadiene, 5-methyl-1,3-hexadiene, 2,3-dimethyl-1,3-hexadiene, 2,4-dimethyl-1,3-hexadiene, 2,5-dimethyl-1,3-hexadiene, 2-neopentylbutadiene, 1,3-cyclopentadiene, 1,3-cyclohexadiene, 1-vinyl-1,3-cyclohexadiene and a mixture of these conjugated dienes, and preferably these conjugated dienes are selected from isoprene and a mixture of conjugated dienes containing isoprene.

Preferably for the invention, the elastomer blocks of the thermoplastic elastomers have a number-average molecular weight (Mn) ranging from 25 000 g/mol to 350 000 g/mol, preferably from 35 000 g/mol to 250 000 g/mol, so as to confer, on the thermoplastic elastomers, good elastomeric properties and a mechanical strength which is sufficient and compatible with the use as a tyre outer sidewall.

The elastomer block(s) can also be blocks comprising several types of ethylenic monomers as defined above.

Particularly preferably in the invention, the elastomer block(s) are selected from the group consisting of ethylenic elastomers, polyethers and mixtures of these polymers.

Most particularly preferably in the invention, the elastomer block(s) are chosen from the group consisting of polyethers, ethylene/propylene copolymers, ethylene/butylene copolymers, and mixtures of these polymers.

As previously explained, the thermoplastic polymers that can be used according to the invention also comprise at least one thermoplastic block.

The term "thermoplastic block" is intended to mean a block consisting of polymerized monomers and having a glass transition temperature, or a melting point in the case of semicrystalline polymers, above or equal to 80° C., preferably varying from 80° C. to 250° C., more preferentially varying from 80° C. to 200° C., and in particular varying from 80° C. to 180° C.

Indeed, in the case of a semicrystalline polymer, a melting point may be observed which is above the glass transition temperature. In this case, the melting point and not the glass transition temperature is taken into account for the definition above.

The thermoplastic block(s) may be formed from polymerized monomers of various types.

In particular, the thermoplastic block(s) can consist of the following blocks or a mixture of the following blocks
  polyolefins (polyethylene, polypropylene);
  polyurethanes;
  polyamides;
  polyesters;
  polyacetals;
  polyethers (polyethylene oxide, polyphenylene ether);
  polyphenylene sulphides;
  polyfluorinated compounds (FEP, PFA, ETFE);
  polystyrenes (as detailed below);
  polycarbonates;
  polysulfones;
  poly(methyl methacrylate);
  polyetherimide;
  thermoplastic copolymers such as the acrylonitrile/butadiene/styrene copolymer (ABS), The thermoplastic block(s) may also be obtained from monomers selected from:
  acenaphthylene: those skilled in the art may refer, for example, to the paper by Z. Fodor and J. P. Kennedy, Polymer Bulletin, 1992, 29(6), 697-705;
  indene and its derivatives, such as, for example, 2-methylindene, 3-methylindene, 4-methylindene, dimethylindenes, 2-phenylindene, 3-phenylindene and 4-phenylindene; those skilled in the art may, for example, refer to the patent document U.S. Pat. No. 4,946,899, by the inventors Kennedy, Puskas, Kaszas and Hager, and to the documents J. E. Puskas, G. Kaszas, J. P. Kennedy and W. G. Hager, Journal of Polymer Science, Part A: Polymer Chemistry (1992), 30, 41, and J. P. Kennedy, N. Meguriya and B. Keszler, Macromolecules (1991), 24(25), 6572-6577;
  isoprene, then resulting in the formation of a certain number of trans-1,4-polyisoprene units and of units cyclized according to an intramolecular process; those skilled in the art may, for example, refer to the documents G. Kaszas, J. E. Puskas and J. P. Kennedy, Applied Polymer Science (1990), 39(1), 119-144, and J. E. Puskas, G. Kaszas and J. P. Kennedy, Macromolecular Science, Chemistry A28 (1991), 65-80.

According to one variant of the invention, the above monomers may be copolymerized with at least one other monomer as long as this other monomer does not modify the thermoplastic nature of the block, that is to say that the block has a glass transition temperature, or a melting point in the case of semicrystalline polymers, above or equal to 80° C.

By way of illustration, this other monomer capable of copolymerizing with the polymerized monomer can be selected from diene monomers, more particularly conjugated diene monomers having 4 to 14 carbon atoms, and monomers of vinylaromatic type having from 8 to 20 carbon atoms.

Styrene monomers, namely methylstyrenes, para-(tert-butyl)styrene, chlorostyrenes, bromostyrenes, fluorostyrenes or else para-hydroxystyrene, are suitable in particular as vinylaromatic compounds. Preferably, the comonomer of vinylaromatic type is styrene.

As explained above, the thermoplastic block(s) may be selected from polystyrenes and polymers comprising at least one polystyrene block.

Regarding the polystyrenes, these are obtained from styrene monomers.

Styrene monomer should be understood as meaning, in the present description, any monomer comprising styrene, unsubstituted or substituted; mention may be made, among substituted styrenes, for example, of methylstyrenes (for example, o-methylstyrene, m-methylstyrene or p-methylstyrene, α-methylstyrene, α,2-dimethylstyrene, α,4-dimethylstyrene or diphenylethylene), para-(tert-butyl)styrene, chlorostyrenes (for example, o-chlorostyrene, m-chlorostyrene, p-chlorostyrene, 2,4-dichlorostyrene, 2,6-dichlorostyrene or 2,4,6-trichlorostyrene), bromostyrenes (for example, o-bromostyrene, m-bromostyrene, p-bromostyrene, 2,4-dibromostyrene, 2,6-dibromostyrene or 2,4,6-tribromostyrenes), fluorostyrenes (for example, o-fluorostyrene, m-fluorostyrene, p-fluorostyrene, 2,4-difluorostyrene, 2,6-difluorostyrene or 2,4,6-trifluorostyrenes) or else para-hydroxystyrene.

The thermoplastic block(s) of the thermoplastic elastomers that can be used according to the invention may also consist of several of the thermoplastic blocks as defined above.

The proportion of thermoplastic blocks in the thermoplastic elastomers that can be used according to the invention is determined, on the one hand, by the thermoplasticity properties that the thermoplastic elastomers must have.

The thermoplastic block(s) are preferentially present in sufficient proportions to preserve the thermoplastic nature of the thermoplastic elastomers that can be used according to the invention. The minimum content of thermoplastic blocks in the thermoplastic elastomers may vary as a function of the conditions of use of the thermoplastic elastomers.

On the other hand, the ability of the thermoplastic elastomers to deform during the preparation of the tyre can also contribute to determining the proportion of the thermoplastic blocks in the thermoplastic elastomers that can be used according to the invention.

Preferably, the thermoplastic blocks of the thermoplastic elastomers have a number-average molecular weight (Mn) ranging from 5000 g/mol to 150 000 g/mol, so as to confer, on the thermoplastic elastomers, good elastomeric properties and a mechanical strength which is sufficient and compatible with the use as a tyre outer sidewall.

Particularly preferably in the invention, the thermoplastic block(s) are selected from the group consisting of polystyrenes, polyesters, polyamides, polyurethanes, and mixtures of these polymers.

Very particularly preferably in the invention, the thermoplastic block(s) are selected from the group consisting of polystyrenes, polyesters, polyamides, and mixtures of these polymers.

By way of thermoplastic elastomer that can be used according to the invention, mention may be made of a copolymer of which the elastomer portion is saturated, and which comprises styrene blocks and alkylene blocks.

The alkylene blocks are preferentially ethylene, propylene or butylene.

More preferentially, the thermoplastic elastomers that can be used according to the invention are selected from the following linear or star-branched diblock or triblock copolymers: styrene/ethylene/butylene (SEB), styrene/ethylene/propylene (SEP), styrene/ethylene/ethylene/propylene (SEEP), styrene/ethylene/butylene/styrene (SEBS), styrene/ethylene/propylene/styrene (SEPS), styrene/ethylene/ethylene/propylene/styrene (SEEPS), styrene/isobutylene (SIB), styrene/isobutylene/styrene (SIBS), and mixtures of these copolymers.

Particularly advantageously, the weight content of styrene in each thermoplastic block of the thermoplastic elastomer(s) that can be used according to the invention is less than or equal to 15%.

In this preferential embodiment, the tyre has a low hysteresis. In particular, the tyre has an improved rolling resistance.

Preferably, the content of thermoplastic elastomer(s) of the composition ranges from 65 to 100 phr, preferably ranges from 70 to 100 phr, more preferentially ranges from 75 to 100 phr, and even more preferentially ranges from 95 to 100 phr.

Advantageously, the thermoplastic elastomers that can be used according to the invention are multiblock, for example triblock, thermoplastic elastomers.

In particular, mention may be made of the copolymers comprising blocks of random copolymer of ethylene and of propylene/polypropylene, polyether/polyester PET (poly(ethylene terephthalate)) or polyether/polyester PBT (poly(butylene terephthalate)) (COPE), polyether/polyamide (PEBA).

The polyether blocks are preferentially polyethylene glycols.

Very preferentially, the thermoplastic elastomers that can be used according to the invention are selected from the following copolymers: styrene/ethylene/butylene/styrene (SEBS), polyether/polyester (COPE), polyether/polyamide (PEBA), and mixtures of these copolymers.

By way of examples of commercially available thermoplastic elastomers that can be used according to the invention, mention may be made of the elastomers of SEPS, SEEPS or SEBS type sold by the company Kraton under the name Kraton G (for example products 61650, 61651, 61654, 61730) or the company Kuraray under the name Septon (for example Septon 2007, Septon 4033, Septon 004); or the elastomers of SIS type sold by Kuraray under the name Hybrar 5125 or sold by Kraton under the name D 1161, or else the elastomers of linear SBS type sold by Polimeri Europa under the name Europrene SOL T 166 or of star-branched SBS type sold by Kraton under the name D1184. Mention may also be made of the elastomers sold by Dexco Polymers under the name Vector (for example Vector 4114 or Vector 8508).

It is also possible for the thermoplastic elastomers given as example above to be mixed with one another within the composition of the outer sidewall of the tyre that can be used according to the invention.

It is also possible for the thermoplastic elastomers presented above to be in a mixture with other thermoplastic elastomers, the elastomer block(s) being unsaturated.

It is also possible for the thermoplastic elastomers shown above to be in a mixture with other non-thermoplastic elastomers.

Particularly preferably, the thermoplastic elastomer(s) that can be used according to the invention are the only elastomers of the elastomeric matrix of the composition.

The thermoplastic elastomer(s) described above are sufficient by themselves for the outer sidewall of the tyre according to the invention to be usable.

However, in the case where the thermoplastic elastomers are mixed with non-thermoplastic elastomers, the composition according to the invention may then comprise one or more diene rubbers by way of non-thermoplastic elastomer.

The term "diene" elastomer or rubber should be understood to mean in a known manner one or more elastomers at least partly derived (i.e. a homopolymer or a copolymer) from diene monomers (monomers bearing two conjugated or non-conjugated, carbon-carbon double bonds).

These diene elastomers can be categorized into two categories: "essentially unsaturated" or "essentially saturated".

The term essentially unsaturated" is generally intended to mean a diene elastomer at least partly derived from conjugated diene monomers, having a molar content of moieties or units of diene origin (conjugated dienes) which is greater than 15%. In the category of "essentially unsaturated" diene elastomers, the term "highly unsaturated" diene elastomer is intended to mean in particular a diene elastomer having a molar content of moieties of diene origin (conjugated dienes) which is greater than 50%.

Thus, diene elastomers such as certain butyl rubbers or copolymers of dienes and of alpha-olefins of EPDM type can be described as "essentially saturated" diene elastomers (low or very low content of moieties of diene origin, always less than 15%).

These definitions being given, the term "diene elastomer" is more particularly intended to mean, regardless of the above category, capable of being used in the composition that can be used according to the invention:

a)—any homopolymer obtained by polymerization of a conjugated diene monomer having from 4 to 12 carbon atoms;

b)—any copolymer obtained by copolymerization of one or more conjugated dienes with one another or with one or more vinylaromatic compounds containing from 8 to 20 carbon atoms;

c)—a ternary copolymer obtained by copolymerization of ethylene and an α-olefin having from 3 to 6 carbon atoms with an unconjugated diene monomer having from 6 to 12 carbon atoms, such as, for example, the elastomers obtained from ethylene and propylene with an unconjugated diene monomer of the abovementioned type, such as, especially, 1,4-hexadiene, ethylidenenorbornene or dicyclopentadiene;

d)—a copolymer of isobutene and of isoprene (diene butyl rubber) and also the halogenated versions, in particular chlorinated or brominated versions, of this type of copolymer.

The following are especially suitable as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, aryl-1,3-butadienes, 1,3-pentadiene, 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers of the diene elastomers can contain between 99% and 20% by weight of diene units and between 1% and 80% by weight of vinylaromatic units. The diene elastomers can have any microstructure, which depends on the polymerization conditions used, in particular on the presence or absence of a modifying and/or randomizing agent and on the amounts of modifying and/or randomizing agent employed. The elastomers can, for example, be prepared in dispersion or in solution; they can be coupled and/or star-branched or else functionalized with a coupling and/or star-branching or functionalization agent. For coupling with carbon black, mention may be made, for example, of functional groups comprising a C—Sn bond or aminated functional groups, such as benzophenone, for example; for coupling to a reinforcing inorganic filler, such as silica, mention may be made, for example, of silanol functional groups or polysiloxane functional groups having a silanol end (such as described, for example, in FR 2 740 778 or U.S. Pat. No. 6,013,718), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,973). Mention may also be made, as other examples of functionalized elastomers, of elastomers (such as SBR, BR, NR or IR) of the epoxidized type.

The composition used in the outer sidewall of the tyre according to the invention can also comprise one or more reinforcing fillers.

In particular, use may be made of any type of filler commonly used for the manufacture of tyres, for example an organic filler, such as carbon black, an inorganic filler, such as silica, or else a blend of these two types of filler, especially a blend of carbon black and silica.

Preferably, the reinforcing filler(s) is (are) carbon black and/or silica and preferably the reinforcing filler is carbon black.

All the carbon blacks conventionally used in tyres ("tyre-grade" blacks) are suitable as carbon blacks. Mention will more particularly be made, for example, of the reinforcing carbon blacks of the 100, 200 or 300 series (ASTI grades), such as, for example, the N115, N134, N234, N326, N330, N339, N347 or N375 blacks, or else, depending on the applications targeted, the blacks of higher series (for example N660, N683 or N772), indeed even N990.

The term "reinforcing inorganic filler" should be understood, in the present patent application, by definition, to mean any inorganic or mineral filler, whatever its colour and its origin (natural or synthetic), also referred to as "white filler", "clear filler", indeed even "non-black filler", in contrast to carbon black, capable of reinforcing, by itself alone, without means other than an intermediate coupling agent, a composition intended for the manufacture of tyres, in other words capable of replacing, in its reinforcing role, a conventional tyre-grade carbon black; such a filler is generally characterized, in a known way, by the presence of hydroxyl (—OH) groups at its surface.

The physical state in which the reinforcing inorganic filler is provided is not important, whether it is in the form of a powder, of micropearls, of granules, of beads or any other appropriate densified form. Of course, the term "reinforcing inorganic filler" is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are especially suitable as reinforcing inorganic fillers. The silica used can be any reinforcing silica known to those skilled in the art, in particular any precipitated or fumed silica exhibiting a BET surface and also a CTAB specific surface both of less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface as described in application WO 03/16837.

In order to couple the reinforcing inorganic filler to the elastomer, it is possible, for example, to use, in a known way, an at least bifunctional coupling agent (or bonding agent) intended to provide a satisfactory connection, of chemical and/or physical nature, between the inorganic filler (surface of its particles) and the elastomer, in particular bifunctional organosilanes or polyorganosiloxanes.

The content by volume of optional reinforcing filler in the composition (carbon black and/or reinforcing inorganic filler such as silica) is within a range extending from 0% to 30%, which corresponds approximately to a content of 0 to 100 phr for a plasticizer-free composition. Preferentially, the composition according to the invention comprises less than 30 phr of reinforcing filler, and more preferentially less than 10 phr.

According to one preferential variant of the invention, the composition does not contain reinforcing filler.

In the same way, the composition used in the outer sidewall of the tyre according to the invention can contain one or more inert micrometric fillers, such as platy fillers known to those skilled in the art.

Preferably, the composition used in the outer sidewall of the tyre according to the invention does not contain micrometric filler.

The thermoplastic elastomer(s) described above are sufficient by themselves for the outer sidewall of the tyre according to the invention to be usable.

Preferably, the composition does not contain any cross-linking system.

However, according to one preferential embodiment of the invention, the composition used in the outer sidewall of the tyre according to the invention may also comprise at least one plasticizing agent, such as an oil (or a plasticizing oil or extender oil), or a plasticizing resin, the role of which is to facilitate the processing of the outer sidewall, in particular its incorporation into the pneumatic object, by lowering the modulus and increasing the tackifying power.

Use may be made of any type of plasticizer which can be a resin or an extender oil. The designation "resin" is reserved in the present patent application, by definition known to those skilled in the art, for a compound which is solid at ambient temperature (23° C.), in contrast to a liquid plasticizing compound, such as an extender oil or a plasticizing oil. At ambient temperature (23° C.), these oils, which are more or less viscous, are liquid (that is to say, as a reminder, substances which have the ability to eventually assume the shape of their container), in contrast especially to resins or rubbers, which are by nature solid.

Hydrocarbon resins are polymers well known to those skilled in the art, essentially based on carbon and hydrogen, that can be used in particular as plasticizing agents in elastomeric compositions. They have been described, for example, in the work entitled "Hydrocarbon Resins" by R. Mildenberg, M. Zander and G. Collin (New York, V C H, 1997, ISBN 3-527-28617-9), Chapter 5 of which is devoted to their applications, in particular in the tyre rubber field (5.5. "Rubber Tires and Mechanical Goods"). They may be aliphatic, cycloaliphatic, aromatic, hydrogenated aromatic, or of the aliphatic/aromatic type, that is to say based on aliphatic and/or aromatic monomers. They can be natural or synthetic and are or are not based on petroleum (if such is the case, they are also known under the name of petroleum resins). They are by definition miscible (i.e., compatible) at the contents used with the elastomeric compositions for which they are intended, so as to act as true diluents. Their Tg is preferably greater than 0° C., in particular greater than 20° C. (most often between 30° C. and 120° C.).

In a known way, these hydrocarbon resins can also be described as thermoplastic resins in the sense that they soften when heated and can thus be moulded. They can also be defined by a softening point, the temperature at which the product, for example in the powder form, sticks together. The softening point of a hydrocarbon-based resin is generally greater by approximately 50 to 60° C. than its Tg value.

Mention may be made, as examples of such hydrocarbon resins, of those selected from the group consisting of cyclopentadiene (abbreviated to CPD) or dicyclopentadiene (abbreviated to DCPD) homopolymer or copolymer resins, terpene homopolymer or copolymer resins, terpene/phenol homopolymer or copolymer resins, $C_5$ fraction homopolymer or copolymer resins, $C_9$ fraction homopolymer or copolymer resins, α-methylstyrene homopolymer or copolymer resins and mixtures of these resins. Among the above copolymer resins, mention may be made more particularly of those selected from the group consisting of (D)CPD/vinylaromatic copolymer resins, (D)CPD/terpene copolymer resins, (D)CPD/C5 fraction copolymer resins, (D)CPD/C5 fraction copolymer resins, (D)CPD/C9 fraction copolymer resins, terpene/vinylaromatic copolymer resins, terpene/phenol copolymer resins, C5 fraction/vinylaromatic copolymer resins and mixtures of these resins.

The term "terpene" groups together here, in a known way, α-pinene, β-pinene and limonene monomers; use is preferably made of a limonene monomer, a compound which exists, in a known way, in the form of three possible isomers: L-limonene (laevorotatory enantiomer), D-limonene (dextrorotatory enantiomer) or else dipentene, a racemate of the dextrorotatory and laevorotatory enantiomers. Suitable as vinylaromatic monomer are, for example: styrene, α-methylstyrene, ortho-methylstyrene, meta-methylstyrene, para-methylstyrene, vinyltoluene, para(tert-butyl)styrene, methoxystyrenes, chlorostyrenes, hydroxystyrenes, vinylmesitylene, divinylbenzene, vinylnaphthalene or any vinylaromatic monomer resulting from a $C_9$ fraction (or more generally from a $C_8$ to $C_{10}$ fraction).

More particularly, mention may be made of the resins selected from the group consisting of (D)CPD homopolymer resins, (D)CPD/styrene copolymer resins, polylimonene resins, limonene/styrene copolymer resins, limonene/D(CPD) copolymer resins, $C_5$ fraction/styrene copolymer resins, $C_5$ fraction/$C_9$ fraction copolymer resins and mixtures of these resins.

All the above resins are well known to those skilled in the art and are commercially available, for example sold by DRT under the name Dercolyte as regards polylimonene resins, by Neville Chemical Company under the name Super Nevtac, by Kolon under the name Hikorez or by Exxon Mobil under the name Escorez as regards $C_5$ fraction/styrene resins or $C_5$ fraction/$C_9$ fraction resins, or by Struktol under the name 40 MS or 40 NS (mixtures of aromatic and/or aliphatic resins).

Preferably, the extender oil is selected from the group consisting of polyolefinic oils (that is to say oils, resulting from the polymerization of monoolefinic or diolefinic olefins), paraffinic oils, naphthenic oils (of low or high viscosity), aromatic oils, mineral oils and mixtures of these oils.

The number-average molecular weight (Mn) of the extender oil is preferentially between 200 and 25 000 g/mol, more preferentially still between 300 and 10 000 g/mol. For excessively low Mn weights, there is a risk of the oil migrating outside the composition, whereas excessively high weights can result in excessive stiffening of this composition. An Mn weight of between 350 and 4000 g/mol, in particular between 400 and 3000 g/mol, has proved to constitute an excellent compromise for the targeted applications, in particular for use in a tyre outer sidewall.

The number-average molecular weight (Mn) of the extender oil is determined by size exclusion chromatography (SEC), the sample being dissolved beforehand in tetrahydrofuran at a concentration of approximately 1 g/l; the solution is then filtered through a filter with a porosity of 0.45 m before injection. The apparatus is the Waters Alliance chromatographic line. The elution solvent is tetrahydrofuran, the flow rate is 1 ml/min, the temperature of the system is 35° C. and the analysis time is 30 min. A set of two Waters columns with the Styragel HT6E name is used. The injected volume of the solution of the polymer sample is 100 μl. The detector is a Waters 2410 differential refractometer and its associated software, for making use of the chromatographic data, is the Waters Millennium system. The calculated average molar masses are relative to a calibration curve produced with polystyrene standards.

When it is used, it is preferable for the content of plasticizer to vary from 2 to 60 phr, more preferentially from 3 to 50 phr. Below the minimum indicated, the presence of plasticizer is not perceptible. Above the recommended maximum, the risk is encountered of insufficient cohesion of the composition.

The composition that can be used in the outer sidewall of the tyre according to the invention can also comprise a platy filler.

The optional use of platy filler advantageously makes it possible to lower the coefficient of permeability (and thus to increase the airtightness) of the composition, without excessively increasing its modulus, which makes it possible to retain the ease of incorporation of the outer sidewall in the pneumatic object.

"Platy" fillers are well known to those skilled in the art. They have been used in particular in tyres in order to reduce the permeability of conventional airtight layers based on butyl rubber. They are generally used at relatively low contents, generally not exceeding 1 to 50 phr, or contents by volume which can vary in particular from 0.1% to 25% by volume of elastomeric composition and preferably from 1% to 20% by volume.

They are generally provided in the form of stacked plates, platelets, sheets or lamellae, with a more or less marked anisometry. Their aspect ratio (A=L/T) is generally greater than 3, more often greater than 5 or than 10, L representing the length (or greatest dimension) and T representing the mean thickness of these platy fillers, these means being calculated on a number basis. Aspect ratios reaching several tens, indeed even several hundreds, are frequent. Their mean length is preferably greater than 1 m (that is to say that "micrometric" platy fillers are then involved), typically of between a few m (for example 5 m) and a few hundred m (for example 500 μm, indeed even 800 μm).

Preferably, the platy fillers used in accordance with the invention are selected from the group consisting of graphites, silicon-based platy mineral fillers and mixtures of such fillers.

Graphite is understood to mean, generally, an assembly of non-compact hexagonal lamellae of carbon atoms: graphenes. Graphite, a hexagonal crystalline system, exhibits a stack of ABAB type, where the B plane is translated relative to the A plane.

Graphite cannot be regarded as a reinforcing filler; however, it can be regarded as a semi-reinforcing (or partially reinforcing) filler in so far as it makes possible an increase in the tensile modulus of an elastomeric composition in which it is incorporated.

Given these definitions, graphite capable of being used in the compositions that can be used according to the invention is understood more particularly to mean:

(a) any natural graphite, associated with rocks affected by metamorphism, after separation of the impurities accompanying the graphite veins and after milling;

(b) any thermally expandable natural graphite, i.e. in which one or more chemical compounds in the liquid state, for example an acid, is intercalated between its graphene planes;

(c) any expanded natural graphite, the latter being produced in two steps: intercalation of one or more chemical compounds in the liquid state, for example an acid, between the graphene planes of a natural graphite by chemical treatment and high-temperature expansion;

(d) any synthetic graphite obtained by graphitization of petroleum coke.

The composition that can be used in the outer sidewall of the tyre according to the invention can contain just one graphite or a mixture of several graphites; thus, it is possible to have a blend of natural graphite and/or of expanded graphite and/or of synthetic graphite.

The graphite as defined above can be provided morphologically in lamellar or non-lamellar form and will in both cases be categorized as a platy filler within the meaning of the present invention.

It has been found, surprisingly, that graphites with either of these two types of morphology are suitable in the composition that can be used according to the invention; however, graphites exhibiting a lamellar form are preferably suitable, all the more so when they are oriented so as to present their largest face perpendicular to the gas permeation stream.

When it is used, the graphite is present in the elastomeric composition at contents ranging from 1 phr to 60 phr and preferably between 5 phr and 30 phr.

Suitable in particular among silicon-based platy mineral fillers are phyllosilicates and particularly those included in the group consisting of smectites, kaolin, talc, mica and vermiculite.

Also suitable for the invention among phyllosilicates are functionalized phyllosilicates and in particular organomodified phyllosilicates. According to a specific embodiment, the organic structure with which the inert filler is combined is a surfactant of formula: $-M+R^3R^4R^5$; where M represents a nitrogen, sulfur, phosphorus or pyridine atom and where $R^3$, $R^4$ and $R^5$ represent a hydrogen atom, an alkyl group, an aryl group or an allyl group, $R^3$, $R^4$ and $R^5$ being identical or different.

In particular, organomodified montmorillonites are suitable for the invention. Thus, montmorillonites modified with a surfactant, such as a dihydrogenated dioctadecyldimethyl quatemary ammonium salt. Such an organomodified montmorillonite is commercially available, in particular from Southern Clay Products under the trade names: Cloisite 6A and 20A.

Other surfactants based on quaternary ammonium salts can also be used to modify phyllosilicates, such as are described in Patent Application WO06/047509.

Mention may be made, as examples of micas, of the micas sold by CMMP (Mica-MU®, Mica-Soft®, Briomica®, for example), those sold by Yamaguchi (A51S, A41S, SYA-21R, SYA-21RS, A21S, SYA-41R), vermiculites (in particular the Shawatec® vermiculite sold by CMMP or the Microlite® vermiculite sold by W. R. Grace), or modified or treated micas (for example, the Iriodin® range sold by Merck). Mention may be made, as examples of graphites, of the graphites sold by Timcal (Timrex® range). Mention may be made, as examples of talcs, of the talcs sold by Luzenac.

The abovementioned inert fillers, other than graphite, are in fact particularly advantageous as they make it possible to improve the impermeability of the compositions in which they are dispersed with an appropriate content. For example, when they are used, their content can vary from 1 phr to 80 phr and preferably from 3 phr to 40 phr.

The introduction of the platy fillers into the composition can be carried out according to various known processes, for example by mixing in solution, by mixing in bulk in an internal mixer, or also by mixing by extrusion.

The composition that can be used for the outer sidewall of the tyre according to the invention can furthermore comprise the various additives normally present in the outer sidewalls known to those skilled in the art. Mention will be made, for example, of non-reinforcing or inert fillers other than the platy fillers described above, plasticizers other than the abovementioned extender oils, UV inhibitors, various processing aids or other stabilizing agents, or also promoters capable of favouring the adhesion to the remainder of the structure of the pneumatic object.

EXAMPLES

1) Preparation of the Compositions

A composition that can be used in the tyre according to the invention (composition B) and a composition that can be used in a comparative tyre (composition A) were prepared using the ingredients and the contents in Table I below. The contents are expressed in phr.

TABLE I

| Ingredients | A (Comp.) | B (Inv.) |
|---|---|---|
| Butadiene rubber[1] | 65 | — |
| Natural rubber | 35 | — |
| SEBS[2] | — | 100 |
| Carbon black[3] | 50 | — |
| Plasticizer[4] | 15 | — |
| Antioxidant 1[5] | 1.5 | — |
| Ozone wax | 1 | — |
| Stearic acid | 1 | — |
| Zinc oxide | 2.4 | — |
| Sulfur | 1.4 | — |
| Vulcanization accelerator[6] | 1.4 | — |

[1]BR ND ML63,
[2]Block copolymer comprising 13% by weight of styrene of the Tuftec H1221 series from the company Asahi Kasai,
[3]Carbon black of the N550 series from the company Cabot,
[4]"Catenex SNR" MES oil from the company Shell,
[5]"Santoflex 6PPD" antioxidant from the company Solutia,
[6]"Santocure CBS" accelerator from the company Solutia.

2) Preparation of the Tyres

Composition A was prepared in appropriate mixers, using two successive phases of preparation according to a general procedure well known to those skilled in the art: a first phase of thermomechanical working or kneading (sometimes referred to as "non-productive" phase) at high temperature, up to a maximum temperature of 140° C., followed by a second phase of mechanical working (sometimes referred to as "productive" phase) at a lower temperature of 60° C., during which finishing phase the crosslinking system is incorporated.

In this instance, the processing of the elastomeric composition is carried out by means of an external mixer.

The composition is then extruded by means of a twin-screw or single-screw extruder. An outer sidewall comprising composition A was obtained. Said outer sidewall is then mounted on a tyre.

Composition B is prepared by extrusion blow-moulding or injection-moulding from a raw material available in the form of balls or granules, in this case by means of a twin-screw extruder at the minimum temperature of 160° C. An outer sidewall comprising composition B was obtained. Said outer sidewall is then mounted on a tyre.

Thus, the tyre provided with an outer sidewall comprising composition A is called tyre A. The tyre provided with the outer sidewall comprising composition B is called tyre B.

3) Tests

Statistical Ozone Test

The two tyres A and B are mounted and inflated, then subjected to load and placed in a cell under an ozone atmosphere for 15 days. The ozone concentration in the cell is maintained at 40 ppm and the temperature is 40° C.

The tyres are arrowed at 20% deformation for the sidewall portion.

Rolling Resistance

The rolling resistance of the tyres is measured on a flywheel, according to method ISO 87-67 (1992).

4) Results

The results of the two tests are collated in Table II below.

TABLE II

| | Tyre | |
|---|---|---|
| | A (comparative) | B (invention) |
| Ozone test | Numerous cracks | No crack |
| Rolling resistance (kg/t) | 8.15 | 7.98 |

It can be noted that tyre B according to the invention has an improved ozone resistance compared with the reference tyre. In addition, tyre B according to the invention has an improved rolling resistance compared with the reference tyre.

The invention claimed is:

1. A tire comprising an ozone-resisting outer sidewall, wherein the outer sidewall comprises at least one composition comprising an elastomeric matrix which predominantly comprises by weight at least one thermoplastic elastomer comprising at least one elastomer block and at least one thermoplastic block, the at least one elastomer block being saturated,
wherein the at least one elastomer block comprises a content of moieties or units derived from conjugated diene monomers which is less than 15 mol %, and
wherein a weight content of styrene in each thermoplastic block is less than or equal to 15%.

2. The tire according to claim 1, wherein the at least one thermoplastic elastomer has a glass transition temperature of less than or equal to 25° C.

3. The tire according to claim 1, wherein a number-average molecular weight of the at least one thermoplastic elastomer is between 30,000 and 500,000 g/mol.

4. The tire according to claim 1, wherein the at least one elastomer block is selected from the group consisting of ethylenic elastomers, polyethers and mixtures thereof.

5. The tire according to claim 4, wherein the at least one elastomer block is selected from the group consisting of polyethers, ethylene/propylene copolymers, ethylene/butylene copolymers, and mixtures thereof.

6. The tire according to claim 1, wherein the at least one thermoplastic block is selected from the group consisting of polyolefins, polyurethanes, polyamides, polyesters, polyacetals, polyethers, polyphenylene sulfides, polyfluorinated compounds, polystyrenes, polycarbonates, polysulfones, polymethyl methacrylate, polyetherimide, thermoplastic copolymers, and mixtures thereof.

7. The tire according to claim 6, wherein the at least one thermoplastic block is selected from the group consisting of polystyrenes, polyesters, polyamides, polyurethanes, and mixtures thereof.

8. The tire according to claim 7, wherein the at least one thermoplastic block is selected from the group consisting of polystyrenes, polyesters, polyamides, and mixtures thereof.

9. The tire according to claim 1, wherein the at least one thermoplastic elastomer is selected from the group consisting of the following linear or star-branched diblock or triblock copolymers: styrene/ethylene/butylene (SEB), styrene/ethylene/propylene (SEP), styrene/ethylene/ethylene/propylene (SEEP), styrene/ethylene/butylene/styrene (SEBS), styrene/ethylene/propylene/styrene (SEP S), styrene/ethylene/ethylene/propylene/styrene (SEEPS), styrene/isobutylene (SIB), styrene/isobutylene/styrene (SIBS), and mixtures thereof.

10. The tire according to claim 1, wherein a content of the at least one thermoplastic elastomer ranges from 65 to 100 phr.

11. The tire according to claim 1, wherein the at least one thermoplastic elastomer is the only elastomer of the elastomeric matrix.

12. The tire according to claim 1, wherein the at least one composition comprises at least one reinforcing filler.

13. The tire according to claim 12, wherein the at least one reinforcing filler is carbon black, silica, or a combination of carbon black and silica.

14. The tire according to claim 1, wherein the at least one composition does not contain a crosslinking system.

* * * * *